Patented Sept. 2, 1947

2,426,882

UNITED STATES PATENT OFFICE 2,426,882

SULFONYL DICYANDIAMIDES AND METHODS FOR THEIR PREPARATION

Donald W. Kaiser and Jack T. Thurston, Riverside, Conn., assignors to American Cyanamid Company, New York, N. Y., a corporation of Maine No Drawing. Application April 11, 1942, Serial No. 438,573

13 Claims. (Cl. 260—397.7)

The present invention relates to a new class of chemical compounds and methods for their preparation. More particularly it relates to sulfonyl dicyandiamides and methods for their preparation.

This new class of compounds are those represented by the following general formula:

X—SO₂D in which X represents an aliphatic or aromatic radical and D represents a dicyandiamide radical. When X is an aliphatic radical it may be a lower or higher aliphatic radical either branched or straight chain or an alicyclic radical, and they may contain hydroxyl, amino, carboxyl, or other substituent groups. Among such aliphatic radicals may be included those such as methyl, ethyl, propyl, butyl, heptyl, octyl, dodecyl, octadecyl, aminoethyl, hydroxyethyl, aminododecyl, hydroxydodecyl, carboxypropyl, cyclohexyl, and the like. When X is an aromatic radical it can be either of the benzene or naphthalene series and includes such radicals having substituent groups on the aromatic ring. Among such aromatic radicals may be included those such as phenyl, naphthyl, tolyl anisidyl, or other phenyl or naphthyl radicals having alkyl, alkoxy, amino, nitro, or hydroxy substituents. In a preferred embodiment the aromatic radical is a phenyl radical having a substituent in the para-position wherein said substituent is an amino radical or a substituted amino radical, such as alkylamino, aralkylamino, arylamino, hydroxylamino, aldose amino, sodium formaldehyde sulfoxylate amino, and the like, or a radical which can be reduced to an amino group, including nitro and azo radicals and acylamino radicals which can be converted to an amino group by hydrolysis. The invention also includes salts of the compounds represented by the above general formula.

The compounds of this invention are useful as intermediates for the production of azo dyes and resins. One of the more important uses is as an intermediate in the preparation of chemotherapeutic agents, such as sulfanilylguanidine.

In general, the compounds of the present invention may be prepared by reacting an aliphatic sulfonyl halide or an aromatic sulfonyl halide with dicyandiamide in the presence of an acid binding agent. Dicyandiamide is usually considered to be neutral in reaction, and it is therefore surprising that dicyandiamide, in spite of its neutrality, can be caused to react with a sulfonyl halide to give a sulfonyl dicyandiamide. We have found that the reaction can be carried out between dicyandiamide and an aliphatic or aromatic sulfonyl halide in the presence of aqueous alkali, preferably in a medium comprising a non-hydroxylated solvent miscible with water, such as acetone or dioxane, to yield the corresponding aliphatic or aromatic sulfonyl dicyandiamide.

The methods for the preparation of representative compounds of our invention will be specifically illustrated in the following examples. It should be understood, however, that the examples are merely illustrative of the preferred methods of preparing representative compounds of the class and are not intended to limit the scope of the invention.

EXAMPLE 1

Benzenesulfonyl dicyandiamide

To a stirred mixture of 33 g. of 85% potassium hydroxide, 50 g. of water, 50.5 g. of dicyandiamide and 150 g. of acetone at 25° was simultaneously added 88.25 g. of benzenesulfonyl chloride and a solution of 33 g. of 85% potassium hydroxide in 40 g. of water. After addition was completed, the mixture was acidified with acetic acid and the solid filtered, washed with a little water and allowed to dry. The yield of potassium benzenesulfonyl dicyandiamide, decomposing at 301° was 69 g. or 52.5% of the theoretical. The salt was dissolved in water, filtered, cooled, and acidified with concentrated hydrochloric acid. The product weighed 54 g. representing a 97% conversion and after recrystallization melted with decomposition at 173°–174° C.

EXAMPLE 2 n-Butylsulfonyl dicyandiamide

To a solution of 198 g. of 85% potassium hydroxide in 200 g. of water was added 117.6 g. of dicyandiamide and 250 g. of acetone. The mixture was stirred and maintained at 15°–20° while a solution of 175 g. of crude n-butylsulfonyl halides, which was prepared from n-butyl isothiourea hydrobromide and chloride, was slowly added. After addition was complete, the mixture was acidified with acetic acid, the colorless solid filtered, washed with methanol, and allowed to dry. The crude potassium n-butylsulfonyl dicyandiamide decomposed at 255°–256° and weighed 132 g., which represented a 61% yield. The salt was dissolved in a minimum amount of hot water, filtered, cooled and acidified with 60 g. of concentrated hydrochloric acid. The colorless solid was filtered, washed with cold water and allowed to dry. The solid decomposed at 123°–

124° and after recrystallization from hot water gave beautiful colorless plates, decomposing at 128°–129°.

EXAMPLE 3

Benzenesulfonyl dicyandiamide

To a stirred mixture of 99 g. of 85% potassium hydroxide, 100 g. of water, 58.8 g. of dicyandiamide and 120 g. of acetone, was gradually added at 15°–20° a solution of 88.25 g. of benzenesulfonyl chloride in 60 g. of acetone. After the addition was complete, the mixture was acidified with acetic acid, the colorless solid filtered, washed with a little methanol and the damp potassium salt of benzenesulfonyl dicyandiamide dissolved in about 700 cc. of boiling water. The solution was filtered and cooled in an ice bath, causing crystals of the potassium salt to separate. The mixture was stirred and 50 g. of concentrated hydrochloric acid was added. After a short time the colorless solid was filtered, washed with a little water and allowed to dry. The yield of product melting at 174°–175° C. was 84 g. or 75% of the theoretical.

EXAMPLE 4 p-Nitrobenzenesulfonyl dicyandiamide

A solution of 15 g. of 85% potassium hydroxide in 20 g. of water was prepared and a mixture of 25 g. of dicyandiamide and 60 g. of acetone was added. The material were stirred and maintained at 20°–25° while a solution of 50 g. of p-nitrobenzenesulfonyl chloride in 40 g. of acetone was gradually introduced simultaneously with another solution of 15 g. of 85% potassium hydroxide in 20 g. of water. After the addition was completed, several hundred cc. of water was added to the mixture and the nearly colorless potassium salt of p-nitrobenzenesulfonyl dicyandiamide was filtered, washed with water and allowed to dry. The yellow filtrate was acidified with concentrated hydrochloric acid which precipitated nearly colorless plates of the free acid. The combined yield of product was about 65% of the theoretical. The salt melted with decomposition at 250°–251° while the free acid decomposed at 124°–126°.

EXAMPLE 5 p-Acetylaminobenzenesulfonyl dicyandiamide

To a stirred mixture of 49.5 g. of 85% potassium hydroxide, 40 g. of water, 33.6 g. of dicyandiamide, and 60 g. of acetone was added at 20° a solution of 58.3 g. of p-acetylaminobenzenesulfonyl chloride in 120 g. of acetone. After the reaction was complete, dilution with water failed to dissolve the solid but acidification with 50 g. of concentrated hydrochloric acid gave a light yellow solution which several minutes later deposited solid. The nearly colorless crystals, after filtration, washing with water, and drying, decomposed at 194°–196° and weighed 37.8 g. A portion crystallized from a mixture of water and the ethyl ether of ethylene glycol gave colorless crystals which decomposed at 195°–196°.

EXAMPLE 6

Sulfanilyl dicyandiamide

Acetylsulfanilyl dicyandiamide, prepared by the process of Example 6, was hydrolyzed to the corresponding sulfanilyl compound as follows:

Five grams of acetylsulfanilyl dicyandiamide was dissolved in a solution of 2.85 g. of sodium hydroxide in 40 cc. of water. The solution was refluxed thirty minutes, cooled and neutralized to maximum precipitation with hydrochloric acid. Several recrystallizations from dilute methanol, using decolorizing carbon, gave colorless crystals. On rapid heating, a sample decomposed at about 238° C. Carbon, hydrogen, and nitrogen analyses were satisfactory.

In the foregoing examples certain specific aliphatic and aromatic sulfonyl chlorides were used in carrying out the reactions. These sulfonyl chlorides may be replaced by the corresponding bromides. Similarly, various other aliphatic and aromatic sulfonyl chlorides may be employed. For example, the p-acetylaminobenzenesulfonyl chloride employed in one of the examples may be replaced by other acyl compounds including those such as propionyl, butyryl, decanoyl, benzoyl, furoyl, nicotinyl, and the like. Similarly, the acid binding agent employed in the examples was potassium hydroxide. Potassium hydroxide may be replaced by another alkali metal base such as sodium hydroxide or other suitable acid binding agent. In the place of acetone we may employ other water miscible organic solvents, such as dioxane.

The following sulfonyl dicyandiamides are mentioned by way of further illustrating the compounds included in this invention. Among the aliphatic sulfonyl dicyandiamides may be included the primary aliphatic sulfonyl dicyandiamides, ethylsulfonyl dicyandiamide, hexylsulfonyl dicyandiamide, decylsulfonyl dicyandiamide, dodecylsulfonyl dicyandiamide, hexadecylsulfonyl dicyandiamide, octadecylsulfonyl dicyandiamide, 2-ethylhexylsulfonyl dicyandiamide, etc.; the secondary aliphatic sulfonyl dicyandiamides, isopropylsulfonyl dicyandiamide, secondary butylsulfonyl dicyandiamide, secondary amylsulfonyl dicyandiamide, etc.; and the tertiary sulfonyl dicyandiamides, tertiary butylsulfonyl dicyandiamide, tertiary amylsulfonyl dicyandiamide, $\alpha,\alpha$-dimethylhexylsulfonyl dicyandiamide; the alicyclic sulfonyl dicyandiamides, cyclohexylsulfonyl dicyandiamide, cyclopentylsulfonyl dicyandiamide, cyclohexylmethylsulfonyl dicyandiamide, $\beta$-cyclohexylethylsulfonyl dicyandiamide, $\alpha$-cyclohexylpropylsulfonyl dicyandiamide, and those alicyclic compounds derived from petroleum. Among the aromatic sulfonyl dicyandiamides may be included those such as p-toluenesulfonyl dicyandiamide, p-carboxybenzenesulfonyl dicyandiamide, m-nitrobenzenesulfonyl dicyandiamide, o-bromobenzenesulfonyl dicyandiamide, p-methoxybenzenesulfonyl dicyandiamide, $\alpha$-naphthalenesulfonyl dicyandiamide, $\beta$-naphthalenesulfonyl dicyandiamide, $\alpha$-5-sulfonaphthalenesulfonyl dicyandiamide, etc.

The compounds prepared in accordance with the present invention are usually isolated in the form of alkali metal salts or as the free acid. When desired other metal salts or amine salts may be produced by reacting the alkali metal salt with water soluble salts of other metals or amine salts. For example, the barium salt, lead salt, mercury salt, ethylamine salt, dibutylamine salt, dodecylamine salt, pyridine salt, may be prepared. Salts can also be prepared by reacting the free acid with metal oxides, hydroxides, or amines.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. A compound of the group consisting of those represented by the following general formula and salts thereof:

$$X—SO_2D$$

in which X is a member of the group consisting of aliphatic and aromatic radicals and D represents a dicyandiamide radical.

2. A compound of the group consisting of those represented by the following general formula and salts thereof:

$$Y—SO_2D$$

in which Y represents an aliphatic radical and D represents a dicyandiamide radical.

3. A compound of the group consisting of those represented by the following general formula and salts thereof:

$$Z—SO_2D$$

in which Z represents an aromatic radical and D represents a dicyandiamide radical.

4. The compound n-butylsulfonyl dicyandiamide.

5. The compound p-acetylaminobenzenesulfonyl dicyandiamide.

6. The compound sulfanilyldicyandiamide.

7. A method of preparing a sulfonyl dicyandiamide which comprises reacting a substance of the group consisting of aliphatic sulfonyl halides and aromatic sulfonyl halides with dicyandiamide in the presence of an acid binding agent.

8. A method of preparing a sulfonyl dicyandiamide which comprises reacting a substance of the group consisting of aliphatic sulfonyl halides, and aromatic sulfonyl halides with dicyandiamide in the presence of an alkali metal hydroxide.

9. A method of preparing an aliphatic sulfonyl dicyandiamide which comprises reacting an aliphatic sulfonyl halide with dicyandiamide in the presence of an alkali metal hydroxide.

10. A method of preparing an aromatic sulfonyl dicyandiamide which comprises reacting an aromatic sulfonyl halide with dicyandiamide in the presence of an alkali metal hydroxide.

11. A method for preparing n-butylsulfonyl dicyandiamide which comprises reacting a butylsulfonyl halide with dicyandiamide in the presence of an alkali metal hydroxide.

12. A method of preparing acetylaminobenzenesulfonyl dicyandiamide which comprises reacting a p-acetylaminobenzenesulfonyl halide with dicyandiamide in the presence of an alkali metal hydroxide.

13. A method of preparing sulfanilyl dicyandiamide which comprises reacting p-acetylaminobenzenesulfonyl chloride with dicyandiamide in the presence of an alkali metal hydroxide to give p-acetylaminobenzenesulfonyl dicyandiamide and hydrolyzing to sulfanilyl dicyandiamide.

DONALD W. KAISER.
JACK T. THURSTON.

REFERENCES CITED

The following references are of record in the file of this patent:

UNITED STATES PATENTS

| Number | Name | Date |
| --- | --- | --- |
| 2,295,884 | Winnek | Sept. 15, 1942 |
| 2,259,721 | Anderson et al. | Oct. 21, 1941 |
| 2,229,784 | Winnek | Jan. 28, 1941 |
| 2,289,541 | Ericks et al. | July 14, 1942 |